UNITED STATES PATENT OFFICE.

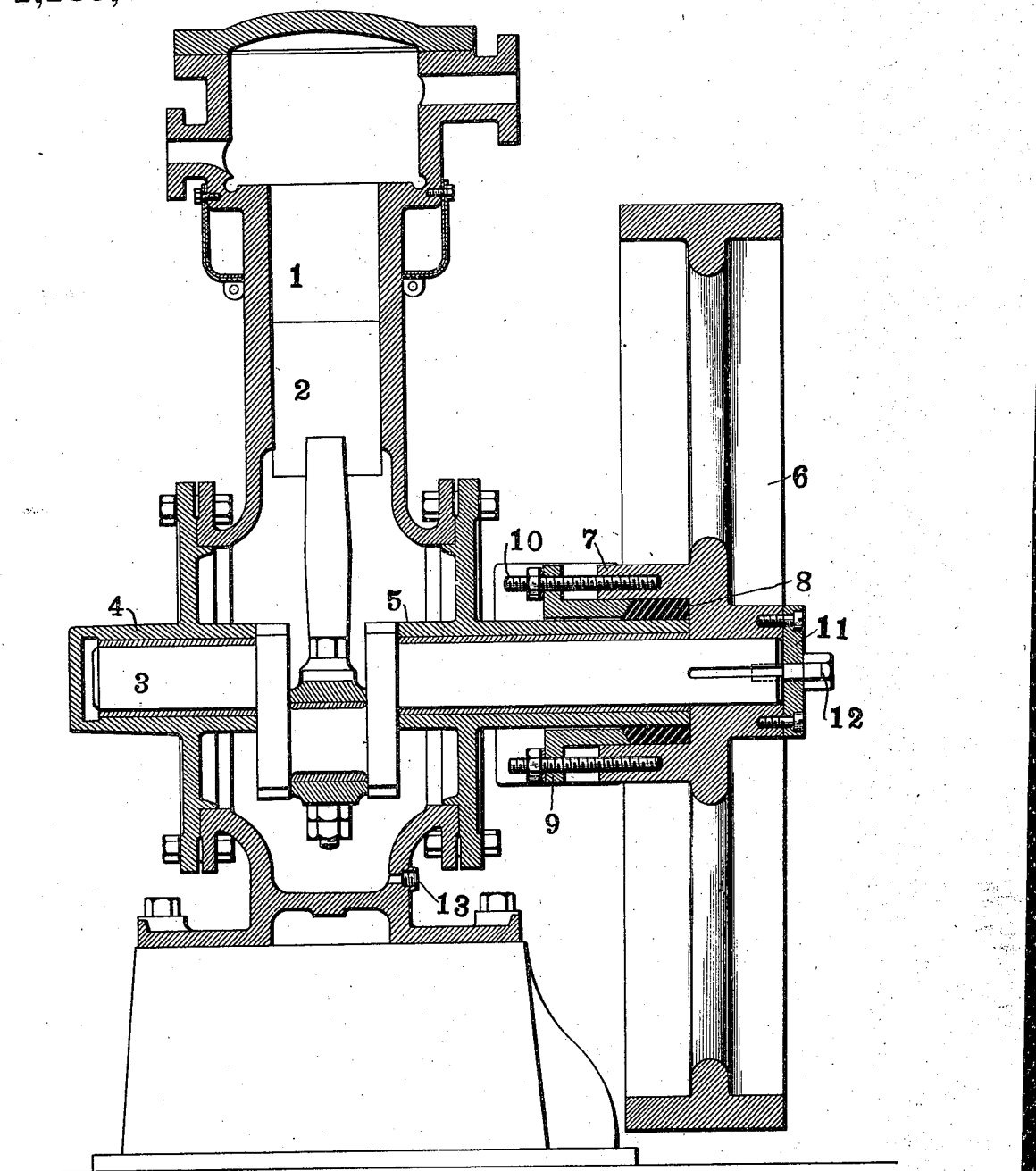

ALAN K. GILLESPIE, OF ST. LOUIS, MISSOURI, ASSIGNOR TO GUS V. BRECHT BUTCHERS' SUPPLY COMPANY, OF ST. LOUIS, MISSOURI, A CORPORATION OF MISSOURI.

PACKING CONSTRUCTION.

1,185,192.	Specification of Letters Patent.	Patented May 30, 1916.

Application filed April 15, 1915. Serial No. 21,585.

*To all whom it may concern:*

Be it known that I, ALAN K. GILLESPIE, a citizen of the United States of America, residing at the city of St. Louis, State of Missouri, have invented a certain new and useful Packing Construction, of which the following is such a full, clear, and exact description as will enable any one skilled in the art to which it appertains to make and use the same, reference being had to the accompanying drawings, forming part of this specification.

My invention relates to compressors for ammonia and other gases or liquids, and, more particularly, to improved construction of the driving mechanism and stuffing box of such machines.

In the operation of ammonia compressors, for example, small quantities of the gas leak past the piston and into the crank case and, in order to render the crank case as completely gas tight as possible, it has been usual to provide an extra bearing for the crank shaft independent from the crank case bearing to carry the weight of the fly wheel and prevent it from so bending the shaft in operation, as to permit leakage between the shaft and the crank case bearing and through the stuffing box. The additional bearing materially adds to the cost and space occupied by the machine and the principal object of this invention is to avoid the necessity for such bearing.

The accompanying drawing is a vertical sectional view of a compressor embodying my invention.

1 represents the compression chamber, 2 the piston, 3 the crank shaft, and 4 and 5 the bearings for said crank shaft. The bearing 5 is somewhat elongated and its exterior surface is cylindrical at its outer end. The fly wheel 6 is supported on the end of the shaft 3 and is provided with an inwardly extending hub portion 7 which is hollowed out and of larger diameter than the exterior diameter of the end of the bearing 5. The hub portion 7 surrounds the end of the bearing 5 and, thus, an annular opening is formed in which the packing 8 is placed. The packing is held in position and compressed by an adjustable collar 9 connected to the hub extension by means of a plurality of bolts 10. The pressure on the packing can be adjusted by means of these bolts as indicated. The outer end of the hub of the fly wheel is provided with a gas-tight cap 11 which covers the end of the crank shaft and a groove is formed in the crank shaft and an opening in the cap 11 for the insertion of the pin 12 which, under conditions of excessive pressure in the crank case, will be blown out and thus relieve the pressure without damage to other parts. The pressure in the crank case is ordinarily kept within proper limits by occasionally removing the plug from the opening 13.

It will be noted that the construction described is simple and compact and that relative movement between the crank shaft and its bearing, or looseness of the bearing, will not affect the operation of the stuffing box to properly prevent the escape of the gas.

Having fully described my invention, what I claim as new and desire to secure by Letters-Patent of the United States is:

1. In a device of the character described, the combination of a gas-tight chamber, a shaft and bearing therefor communicating with said chamber, a stuffing box member mounted on the shaft and having a portion, surrounding the exterior of a portion of the bearing, a packing between said last named parts of the stuffing box member and bearing, and means for maintaining said packing in gas-tight relation with the bearing and stuffing-box member.

2. In a device of the character described, the combination of an inclosed crank-case, a shaft, a bearing therefor communicating with the crank case, a wheel mounted on the shaft and having a portion surrounding the exterior of a portion of the bearing, packing between said last named parts of the wheel and bearing, a cap on the outer end of the wheel hub and inclosing the end of the shaft, said cap being provided with an opening, and frictionally held means for closing said opening.

3. In a device of the character described, the combination of an inclosed crank case, a crank shaft, a bearing therefor communicating with the crank case, a wheel mounted on the shaft and having a hub portion surrounding the outer end of the crank shaft bearing, packing between the inner surface of said hub portion and the outer surface of the bearing, and means for holding the packing in position.

4. In a device of the character described, the combination of an inclosed crank case having an elongated crank shaft bearing, a crank shaft, a drive wheel mounted on the end thereof and having a cylindrical opening in one side of its hub of greater diameter than the outer diameter of the end of the crank shaft bearing, packing between the exterior of the bearing and the hub, and a clamping collar adjustably secured to the hub.

In testimony whereof, I have hereunto set my hand and affixed my seal in the presence of the two subscribing witnesses.

ALAN K. GILLESPIE. [L. S.]

Witnesses:
 W. A. ALEXANDER,
 G. M. SHORE.